Figure 1:
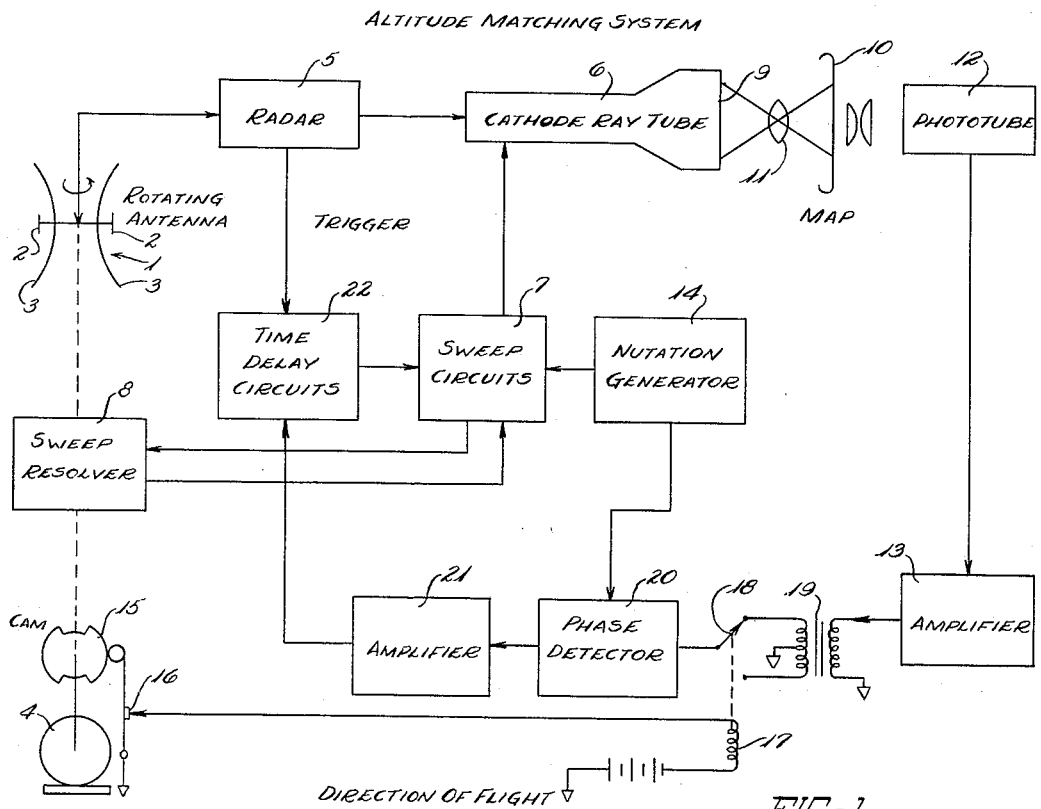

Effect of Altitude Error

Effect of Long. & Lat. Error

INVENTORS
JAMES W. CROSS
CARL A. HELBER

United States Patent Office 3,231,887
Patented Jan. 25, 1966

3,231,887
AIRCRAFT GUIDANCE SYSTEM INCLUDING ALTITUDE CONTROLLING MECHANISM
James W. Cross, Stow, and Carl A. Helber, Akron, Ohio, assignors to Goodyear Aerospace Corporation, a corporation of Delaware
Filed Nov. 9, 1955, Ser. No. 546,062
5 Claims. (Cl. 343—7)

This invention relates to apparatus for automatically guiding an aircraft in flight, and more particularly, is concerned with mechanism for automatically compensating for or correcting any errors in altitude between the flight path which the aircraft is actually flying and the flight path which the aircraft should be flying.

It has been proposed, heretofore, to automatically control the flight path of an aircraft by means of comparison between a previously prepared radar map of the flight path which the aircraft is intended to fly with a radar image of the terrain over which the aircraft is actually flying, the comparison generating errors longitudinally and laterally, with servo mechanisms being operated to return the aircraft to the flight path over the terrain over which the aircraft should be flying. A typical operative system of this type is disclosed in the allowed patent application of Richard L. Burtner, filed February 12, 1949, Ser. No. 76,152 now Patent No. 3,178,707 and entitled "Electro Map Matching Apparatus," assigned to the same assignee as the present application.

It has been found, however, that in spite of the fact that apparatus of the type disclosed and claimed in the aforesaid patent application is employed in conjunction with an automatic pilot, that errors in altitude develop between the radar image of the terrain over which the aircraft is actually flying and the previously prepared radar map of the terrain over which the aircraft should be flying.

It is the general object of the present invention to provide relatively simple, inexpensive, but durable and maintenance-free apparatus for automatically compensating for or at least partially correcting any errors in altitude between the radar image of the terrain over which the aircraft is flying and the radar map of the terrain over which the aircraft should be flying.

Another object of the invention is to provide an altitude matching system in apparatus of the character described and in which errors in altitude are compensated for by controlling the time of start of the radial sweep of the cathode ray tube used to produce the radar image of the terrain over which the aircraft is actually flying.

The foregoing objects of the invention, and other objects which will become apparent as the description proceeds, are achieved by the provision of apparatus including a radar, a PPI tube operated by the radar for producing an image of the terrain over which the aircraft is flying, a rotary antenna for the radar, means for rotating the antenna, a previously prepared map of the terrain over which the aircraft is intended to fly, said map and image being of opposite contrast and to substantially the same scale and orientation, means for superimposing the map and image, means for effecting relative nutating movement between the map and image, phototube and amplifier means for determining the extent of match between the map and image, phase detector means coordinated with the means for rotating the antenna and the means for effecting nutating movement for determining lateral and longitudinal mismatch errors, and timedelay means operated by the phase detector, and means for at least partially correcting any altitude error between the map and image by controlling the time of starting the PPI sweep.

Figure 2:
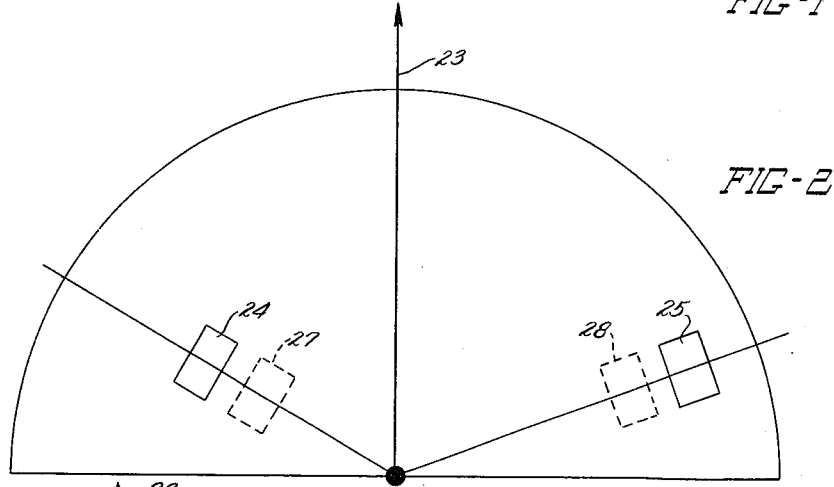
Figure 3:
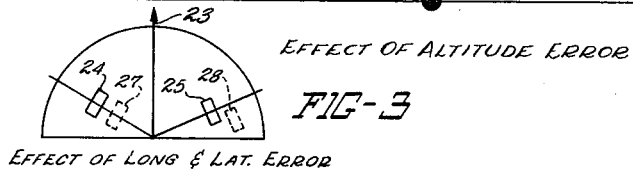

For a better understanding of the invention, reference should be had to the accompanying drawings wherein FIG. 1 is a diagrammatic box diagram of a typical altitude matching system incorporating the principle of the invention;

FIG. 2 is a diagrammatic indication of the effect of an altitude error in the comparison of substantially one-half of the map and image; and FIG. 3 is a view similar to FIG. 2, but on a reduced scale, and showing a lateral and longitudinal error and no altitude error.

Having more particular reference to the drawings, the numeral 1 indicates generally a rotating radar antenna having a pair of back to back antennas 2 and reflector shields 3 with means of known character (not shown) for commutating each antenna 2 so that it operates only through approximately 180° of arcuate movement and during the time that the antenna is directed forwardly of the path of longitudinal movement of the aircraft in which the antenna is mounted, usually in a radome at the nose of the aircraft. The antenna 1 is rotated by a motor 4, and the antenna is connected to a radar 5 having incorporated therewith a cathode ray tube 6 which produces on its face the conventional PPI radar picture or image of the terrain over which the aircraft is actually passing.

Conventional sweep circuits 7 and sweep resolver 8 appropriately triggered by the radar 5 complete the normal radar circuitry and need no further explanation here.

Associated with the radar image 9 of the terrain over which the aircraft is actually flying is a previously prepared map 10 of the terrain over which the aircraft should be or is intended to fly with this map being substantially to the same scale and orientation as the image 9, but of opposite contrast thereto. The map 10 and image 9 are compared for errors, and this can be accomplished by optically superimposing the map and image by means of a lens system 11, and with an error or mismatch between the superimposed map and image being determined by a phototube 12 and an amplifier 13.

Usually, in comparing the map 10 and image 9 for amount of match or error, a scanning or nutating movement is provided between the map and image. This movement can be accomplished mechanically, optically or electronically, and in the form of the invention illustrated in FIG. 1, it is accomplished electronically by means of a nutation generator 14 connected through the sweep circuit 7 to the deflection coils of the cathode ray tube 6 with, for example 60 cycle sine and cosine voltage 90° out of phase so as to effect a continuous rotating or nutating movement of the image 9 on the face of the tube, all in the manner more fully taught and described in the above mentioned patent application. Optical and mechanical nutating mechanism is disclosed in the allowed patent application of James Byron Jones, filed December 6, 1947, under Serial No. 790,151, now Patent No. 3,155,969, and entitled: "Methods and Apparatus for Controlling Vehicle Movement."

It is necessary to divide the error information into quadrants or similar arcuate portions to separate the lateral and longitudinal information, all as set forth in detail in the aforesaid patent applications, and this is accomplished in the form of the invention illustrated by providing a cam 15 on the shaft of the rotary antenna 1 so that the cam is rotated synchronously with the operation of the radar antennas 2 by the motor 4. The cam opens and closes a switch 16 which controls the operation of a solenoid 17 for throwing a switch 18 connected to the secondary output of a transformer 19 which has its primary connected to the amplifier 13. The split secondary of the transformer 19 is thus connected oppositely in each quadrant to a phase detector 20 whose output is connected to an amplifier 21 and, thence, to a delay circuit 22 which controls the time of starting the radial sweep of sweep circuits 7 as applied to the cathode ray tube 6.

Having reference, for example, to FIG. 2, the diagrammatic indication therein is of two quadrants of the face of the cathode ray tube 6 lying in the direction of the line of flight 23 of the aircraft and on the right and left hand side thereof.

In the left hand quadrant, the rectangle 24 indicates a target reflector somewhat exaggerated in size as produced on the radar image 9, and the right hand forward quadrant shows a target reflector 25 as produced in the radar image 9. When an altitude error exists in relation to the map 10, this becomes evident due to the fact that the target reflector 27 of the left hand quadrant on the map 10 (which is of the same object that produces the target reflector 24 of the radar image 9) is displaced in a radial direction in the manner shown. This is due, of course, to the difference in the slant range to the target reflector when the altitude of the aircraft has changed from that at which the map 10 was made. Likewise, the target reflector 25 of the right hand quadrant of the radar image 9 is displaced in a radial direction from the same target reflector 28 present on the map 10.

In this case of a definite altitude mismatch the input to the phase detector 20 from the right quadrant containing targets 25 and 28 is in the same sense as the input from the left quadrant containing targets 24 and 27 and the effect is for the inputs to be additive so that there is a resulting output of the phase detector 20 which effects altitude compensating in a manner which will now be described.

It will be recognized that if the start of the radial sweep of the cathode ray tube 6 is delayed (or advanced as the case might be) that the reflectors 24 and 27 can be brought into substantial radial alignment with each other, namely, by repositioning the reflector 24 so that it is brought into alignment with the reflector 27. In a like manner, the reflector 25 of the radar image 9 is brought in the right hand forward quadrant into radial alignment with the reflector 28 of the map 10 to thereby compensate for any error in altitude between the map 10 and the radar image 9.

If in the operation of the apparatus, reflectors 25 and 28 on the image and map, respectively, were reversed and offset vertically in the opposite direction, but with reflectors 24 and 27 remaining as shown, all as shown on reduced scale in FIG. 3, then it is seen that a lateral and longitudinal error and not an altitude error would exist, and there would be no altitude compensating. In this case the input to the phase detector from the right quadrant containing targets 25 and 28 is in the opposite sense to the input from the left quadrant containing targets 24 and 27 and the effect is for the inputs to cancel each other so that there is no altitude compensating action. It is only when the scale of map and image are different, i.e., when map reflectors 27 and 28 of both left and right quadrants lie radially inside as shown (or radially outside as the case might be) of identical reflectors 24 and 25 of the radar image that altitude compensation occurs to, in effect, bring the map and image back to the same scale.

It will be understood that the aircraft is guided and controlled mainly by a conventional automatic pilot, and that normally there will not be very much error in altitude between the map 10 and the image 9. Any error which does occur and which is determined in the manner indicated, can be compensated for by the mechanism and in the manner described. Thus, it can be stated that the error is compensated for rather than corrected. However, it is also possible to employ the altitude error signal to correct any difference in altitude between the actual flight path and the intended flight path of the aircraft by utilizing the error signal to drive a servo mechanism to actually operate the elevators of the aircraft in a direction and through a period of time to actually bring the aircraft back to the intended altitude of the flight path.

The operation of the apparatus of the present invention does not prevent the normal operation of the apparatus to determine "right-left" and "fore-aft" errors which are automatically compensated for in the usual manner as set forth in detail in the aforesaid patent application.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for automatically guiding an aircraft including a radar, a PPI tube operated by the radar for producing an image of the terrain over which the aircraft is flying, a rotary antenna for the radar, means for rotating the antenna, a previously prepared map of the terrain over which the aircraft is intended to fly, said image and map being of opposite contrast and to substantially the same scale and orientation, means for superimposing the map and image, means for effecting relative nutating movement between the map and image, phototube and amplifier means for determining the extent of match between the map and image, phase detector means coordinated with the means for rotating the antenna and the means for effecting nutating movement for determining lateral and longitudinal mismatch errors, and time delay means operated by the phase detector means for compensating for any slant range error between the reflectors shown on the map and image and due to altitude difference by controlling the time of starting the PPI sweep.

2. In a guided aircraft system, means including a cathode ray tube for producing a radar image of the terrain over which the aircraft is flying, an opposite contrast radar map of the terrain over which the aircraft should be flying, means for comparing the map and image, and means controlled by the last-named means for changing the starting time of the radial sweep circuit of the cathode ray tube to compensate for any difference in slant range of the reflectors shown on the map and image and due to altitude difference.

3. In a guided aircraft system, means including a cathode ray tube for producing a radar image of the terrain over which the aircraft is flying, an opposite contrast radar map of the terrain over which the aircraft should be flying, means for comparing the map and image, and means controlled by the last-named means for changing the starting time of the sweep circuit of the cathode ray tube to compensate for any difference in slant range of the reflectors shown on the map and image and due to altitude difference between the height at which the radar map was prepared and the height at which the aircraft is flying.

4. Apparatus for automatically guiding an aircraft including a radar, a PPI tube operated by the radar for producing an image of the terrain over which the aircraft is flying, a rotary antenna for the radar, means for rotating the antenna, a previously prepared map of the terrain over which the aircraft is intended to fly, said image and map being of opposite contrast and to substantially the same scale and orientation, means including nutating means for determining the extent of match between the map and image, phase detector means coordinated with the means for rotating the antenna and the nutating means for determining lateral and longitudinal mismatch errors, and time delay means operated by the phase detector means for compensating for any slant range error between the reflectors shown on the map and image by controlling the time of starting the PPI sweep.

5. Apparatus for automatically guiding an aircraft including a radar, a PPI tube operated by the radar for producing an image of the terrain over which the aircraft is flying, a rotary antenna for the radar, means for rotating the antenna, a previously prepared map of the terrain over which the aircraft is intended to fly, said image and map being of opposite contrast and to substantially the same scale and orientation, means for determining the extent of match between the map and image, and means for compensating for any slant range error between the reflectors shown on the map and image by controlling the time of starting the PPI sweep.

References Cited by the Examiner

Guided Missiles Fundamentals, Dept. of the Air Force, (AF Manual 52–31), page 444 relied on.

CHESTER L. JUSTUS, *Primary Examiner.*

NORMAN H. EVANS, FREDERICK M. STRADER,
*Examiners.*